United States Patent [19]

Kasuya

[11] Patent Number: 4,980,413

[45] Date of Patent: Dec. 25, 1990

[54] CURABLE ORGANOPOLYSILOXANE COMPOSITION EXHIBITING IMPROVED ADHESION IN THE CURED FORM

[75] Inventor: Akira Kasuya, Chiba, Japan

[73] Assignee: Dow Corning Toray Silicone Company, Ltd., Tokyo, Japan

[21] Appl. No.: 471,449

[22] Filed: Jan. 29, 1990

[30] Foreign Application Priority Data

Feb. 20, 1989 [JP] Japan .................................. 1-39732

[51] Int. Cl.$^5$ ............................................... C08K 5/54
[52] U.S. Cl. .................................... 524/730; 524/773; 524/317; 524/265
[58] Field of Search ................. 524/730, 773, 317, 265

[56] References Cited

U.S. PATENT DOCUMENTS

| | | | |
|---|---|---|---|
| 3,892,707 | 7/1975 | Itoh et al. | 260/37 SB |
| 4,082,726 | 4/1978 | Mine | 260/46.5 |
| 4,087,585 | 5/1978 | Schulz | 428/429 |
| 4,737,562 | 4/1988 | Chaudhury et al. | 528/14 |
| 4,742,103 | 5/1988 | Morita et al. | 524/773 |
| 4,786,701 | 11/1988 | Tanaka | 528/15 |
| 4,788,311 | 11/1988 | Inoue et al. | 556/435 |

FOREIGN PATENT DOCUMENTS 28309 3/1975 Japan .

*Primary Examiner*—John C. Bleutge
*Assistant Examiner*—Karen A. Hellender
*Attorney, Agent, or Firm*—Robert Spector

[57] ABSTRACT

Organopolysiloxane compositions curable by a hydrosilylation reaction contain a novel adhesion promoter consisting essentially of (1) a carboxylic acid ester containing an acryloyloxy or methacryloyloxy group and an alcoholic functional group and (2) an organosilicon compound containing a silicon-bonded vinyloxy or substituted vinyloxy group. The compositions exhibit excellent adhesion to both organic and inorganic substrates that are in contact with the compositions during curing. The adhesion on plastics is especially good.

5 Claims, No Drawings

CURABLE ORGANOPOLYSILOXANE COMPOSITION EXHIBITING IMPROVED ADHESION IN THE CURED FORM

BACKGROUND OF THE INVENTION

1. Field of the Invention

The present invention relates to organopolysiloxane compositions that cure by a platinum-catalyzed hydrosilylation reaction. More particularly, this invention relates to curable organopolysiloxane compositions of this type having excellent self-bonding properties to both organic and inorganic substrates with which they are in contact during curing.

2. Relevant Prior Art

Organopolysiloxane compositions that undergo curing by hydrosilylation induced by platinum catalysts have been known for a long time. Numerous efforts have been made to impart self-adhesive properties to these compositions (Japanese Kokoku Pat. Nos. Sho 51[1976]-28309, U.S. Pat. No. 4,082,726, which issued to Mine et al on Apr. 4, 1978, U.S. Pat. No. 4,087,585, which issued to Schulz on May 2, 1978, as well as Japanese Kokai Patent No. Sho 54[1979]-91159). It is well known in the art that self-bonding compositions of this type may contain as adhesion promoters an organoalkoxysilane containing an acryloyloxy or methacryloyloxy group (Japanese Kokoku Pat. No. Sho 51[1976]-28309), an organopolysiloxane containing an epoxy, an alkenyl, and an alkoxy group (U.S. Pat No. 4,082,726), or a silane containing a 1-methylvinyloxy group (U.S. Pat. No. 3,892,707, issued to Ito et al. on July 1, 1975).

These organopolysiloxane compositions adhere well to inorganic substrates such as glass or metal, but exhibit poor adhesion to organic substrates such as plastics prepared using one or more organic polymers.

U.S. Pat. No. 4,788,311, which issued to Y. Inoue et al. on Nov. 29, 1988 discloses alpha, omega-disilyl substituted alkanes wherein one of the two silicon atoms contains at least one alkenyloxy group and the second silicon atom contains at least one alkoxy or alkenyloxy group. These compounds are useful as stabilizers for room temperature curable organosiloxane compositions comprising a hydroxyl-terminated polyorganosiloxane, an alkyl silicate and, as the curing catalyst, a metal salt of an organic acid.

SUMMARY OF THE INVENTION

An objective of the present invention to overcome the technological problems associated with prior art adhesion promoters and provide organopolysiloxane compositions curable by a hydrosilylation reaction that exhibit good adhesion not only to inorganic materials but also to plastics.

This objective is achieved by adding to the curable composition an adhesion promoter consisting essentially of (1) a carboxylic acid ester containing acryloyloxy or methacryloyloxy group and a hydroxyalkyl group, and (2) an organosilicon compound containing a silicon-bonded vinyloxy or substituted vinyloxy group. Compounds disclosed in the aforementioned patent to Inoue et al. can be used as the organosilicon compound of the present compositions. The adhesion promoter can be added as 2 separate ingredients or the ingredients can be pre-reacted.

DETAILED DESCRIPTION OF THE INVENTION

This invention provides an improved curable organopolysiloxane composition comprising:

A. an organopolysiloxane containing two or more alkenyl radicals bonded to silicon atoms in a molecule;

B. an organohydrogenpolysiloxane containing at least two silicon-bonded hydrogen atoms per molecule in an amount equivalent to a molar ratio of silicon-bonded hydrogen atoms to alkenyl radicals in said organopolysiloxane of from 0.5:1 to 5:1;

C. an amount of a hydrosilylation reaction catalyst sufficient to promote curing of said composition; and an amount of an adhesion promoter sufficient to achieve adhesion of the cured composition to a substrate with which said composition is in contact during curing.

The improvement comprises the presence as said adhesion promoter of either (1) a mixture consisting essentially of D. from 0.01 to 5 weight percent, based on the combined weights of components A and B, of a carboxylic acid ester containing an acryloyloxy or methacryloyloxy group and a hydroxyalkyl group; and E. from 0.01 to 10 weight percent, based on the combined weights of components A and B, of an organosilicon compound containing a silicon-bonded vinyloxy or substituted vinyloxy group, or (2) a reaction product of said carboxylic acid ester and said organosilicon compound.

The curable organopolysiloxane compositions of the present invention are mixtures of components A-E. Components D and E can be present as separate ingredients o these ingredients can be pre-reacted before being combined with components A, B and C of the present compositions. When all of these ingredients are combined the compositions begin to cure at room temperature. The curing rate can be accelerated by heating the compositions.

The cured compositions adhere strongly to substrates that they are in contact with during curing.

Each ingredient of the present compositions will now be explained in detail.

Component A is an organopolysiloxane having two or more alkenyl radicals bonded to silicon atoms in a molecule and is the main component of the compositions of the present invention. This component undergoes an addition reaction with the organohydrogenpolysiloxane, component B, under the influence of a platinum-containing hydrosilylation catalyst, component C.

Component A may exhibit a linear, branched, cyclic, network, or tridimensional structure. While there are no specific restrictions on the molecular weight of this component, to achieve acceptable workability with other components and good adhesive properties, more than one-half of component A should be linear or branched and have a viscosity below 1,000,000 at 25° C.

The silicon-bonded alkenyl radicals of component A can be vinyl, allyl, propenyl, butenyl, pentenyl, hexenyl, heptenyl, octenyl, nonenyl, or decenyl. Preferably the carbon-to-carbon double bond is located at the terminal position of the radical, based on the reactivity of these radicals in the curing reaction. Organic groups other than the alkenyl radicals that can be bonded to the silicon atoms of component A include alkyl radicals methyl, ethyl, propyl, butyl, pentyl, and hexyl; aryl radicals phenyl, tolyl and xylyl; aralkyl radicals such as benzyl and phenethyl; and haloalkyl radicals such as trifluoropropyl and chloromethyl.

The silicon-bonded groups of component A may contain substituents such as hydroxyl and alkoxy groups. In terms of economy and adhesive properties, more than one-half of the silicon-bonded groups present in component A should be methyl radicals.

Component B is an organohydrogenpolysiloxane containing at least two silicon-bonded hydrogen atoms per molecule. This component is the crosslinking agent of the present compositions, and crosslinks with component A by an addition reaction. There are no particular restrictions on the structure and molecular weight of component B. Other than the silicon-bonded hydrogen atoms the other groups bonded to silicon are the same as described for component A. Methyl radicals are the preferred substituent.

Specific examples of component B include but are not limited to trimethylsiloxy-terminated methylhydrogenpolysiloxanes and dimethylsiloxane/methylhydrogensiloxane copolymers, dimethylhydrogensiloxy-terminated methylhydrogenpolysiloxanes, dimethylpolysiloxanes and dimethylsiloxane/methylhydrogensiloxane copolymers, cyclic methyl hydrogen polysiloxanes, cyclic dimethylsiloxane/methyl hydrogen siloxane copolymers, tetrakis(dimethylhydrogensiloxy)silane, copolymers comprising $(CH_3)_2HSiO_{\frac{1}{2}}$ units, $(CH_3)_3SiO_{\frac{1}{2}}$ units, and $SiO_2$ units, and copolymers of $(CH_3)_2HSiO_{\frac{1}{2}}$ units, $(CH_3)_3SiO_{\frac{1}{2}}$ units, $CH_3SiO_{3/2}$ units, and $(CH_3)_2SiO$ units.

The concentration of component B in the present compositions is sufficient to provide a molar ratio of the silicon-bonded hydrogen atoms in this component to the alkenyl radicals of component A of from 0.5:1 to 5:1. Below a ratio of 0.5:1, crosslinking is not sufficient, while at ratios above 5:1 the cured product will be too hard. This ratio is preferably from 0.8:1 to 3:1.

Component C is the catalyst for the crosslinking of components A and B by a hydrosilylation reaction. This catalyst is a metal from group VIII of the Periodic Table. These metals include platinum, rhodium, palladium, cobalt, and nickel. Compounds of one of these metals can be used in place of the metal itself. Preferred catalysts contain platinum, and include but are not limited to finely powdered platinum, platinum on asbestos, platinum on carbon, chloroplatinic acid or its alcohol solution, platinum-olefin complexes, platinum complexes of alkenylsiloxanes, platinum complexes of $\beta$-diketones and platinum complexes of phosphines.

While there are no particular restrictions on the amount of catalyst added, the concentration of the catalyst is preferably from 0.1 to 100 ppm, calculated as platinum or other group VIII metal, based on the combined weight of components A and B.

Component D is a carboxylic acid ester containing an acryloyloxy or methacryloyloxy group and a hydroxyalkyl group. The combination of components D and E, is essential for achieving the self-bonding properties of the present compositions. Specific examples of component D include but are not limited to 2-hydroxyethyl acrylate, 2-hydroxyethyl methacrylate, 2,3-dihydroxypropyl acrylate and 2,3-dihydroxypropyl methacrylate. The concentration of component D is from 0.01 to 5 weight percent, based on the combined weight of components A and B. Below 0.01 weight percent the composition exhibits insufficient adhesion, while above 5 weight percent the properties of the cured compositions may be adversely affected. A concentration of from 0.1 to 2 weight percent is preferred.

Component E is an organosilicon compound containing at least one substituted or unsubstituted vinyloxy group bonded to silicon. When this ingredient contains two silicon atoms, these are preferably located at the terminal positions of an alkenylene radical to form an alpha,omega-bis(organosilyl)alkane. At least one of these silicon atoms is bonded to a substituted or unsubstituted vinyloxy group. Components D and E interact to impart the unique bonding properties that characterize the present compositions.

Component E is an effective adhesion promoter for inorganic substrates even when used alone, but when in combination with component D, the adhesive properties to plastics are particularly enhanced.

Specific examples of component E include but are not limited to 3glycidoxypropyltris(1-methylvinyloxy)silane, 1,2-bis[tris(1-methylvinyloxy)silyl]ethane, tetrakis(1-methylvinyloxy)silane, partial hydrolyzates of these silanes, and mixtures or reaction products derived from these silanes and organopolysiloxanes or polyhydroxylated alcohols.

The concentration of component E in the present compositions is from 0.01 to about 10 weight percent, based on the combined weight of components A and B. Below 0.01 weight percent, the composition does not develop good adhesive properties during curing, while above 10 wt %, the properties of the cured compositions may be adversely affected. A concentration range of from 0.1 to 5 wt % is preferred.

Components D and E can be added to the present compositions as separate ingredients or these ingredients can be premixed before being added to the curable compositions. Preferably a mixture of components D and E are heated to react them and the resultant reaction product is combined with the other ingredients of the present compositions.

The compositions of the present invention are prepared by blending components A, B, C, D and E together with any optional ingredients. These optional ingredients include but are not limited to inorganic fillers such as dry-process silica, wet-process silica, natural silica, kieselguhr, silica microballoons, calcium carbonate, carbon black, titanium dioxide, aluminum oxide, aluminum hydroxide, zinc oxide; colorants, heat stabilizers, antioxidants and fire retardants.

The rate of the crosslinking reaction can be controlled using small amounts of acetylenic hydrocarbons, amine compounds, mercaptan compounds, or phosphorus compounds. Solvents or silicone oils may be added to reduce the viscosity of the composition.

The compositions of this invention can be prepared using various mixing devices, including planetary mixers, kneader mixers, screw mixers, impeller mixers, static mixers, two-roll mills, three-roll mills and twin-screw extruders.

The present compositions cure at room temperature or at elevated temperatures. To obtain better adhesive properties, it is preferable to place the curable composition in contact with the substrate to which it is to bond and heat the resulting composite temperatures of from 70° to 200° C. to cure the organosiloxane composition.

The present compositions adhere to substrates that are in contact with the compositions during curing. In particular, the adhesion on glass, metals, metal oxides, and plastics is excellent. For example, good adhesion is obtained on phenolic resins, epoxy resins, polyamides, unsaturated polyesters, poly(ethylene terephthalate), polycarbonates, polyphenylene sulfide, polyacetals, and polyimides.

The excellent bonding properties of the present compositions make them particularly useful for bonding, fixing, and coating electrical and electronic parts, bonding, fixing, and gap sealing machine parts and devices, and as adhesives for laminating fabrics.

EXAMPLES

The following examples are intended to demonstrate preferred embodiments of the present compositions and should not be interpreted as limiting the invention defined in the accompanying claims. Unless otherwise specified all parts and percentages in the examples are by weight. Viscosities and adhesive were measured at 25° C. In the formulae Me represents a methyl radical and Vi indicates a vinyl radical.

EXAMPLE 1

Composition 1 was prepared by blending to homogeneity 100 parts of a dimethylvinylsiloxy-terminated dimethylpolysiloxane having an average molecular weight of 300, 20 parts of dry-process silica having a surface area of 200 g/m² and surface-treated with hexamethyldisilazane, 5 ppm (calculated as platinum based on the above dimethyl polysiloxane) of a chloroplatinic acid complex with tetramethyldivinyldisiloxane, 4.0 parts of a trimethylsiloxy-terminated methylhydrogensiloxane/dimethylsiloxane copolymer having an average degree of polymerization of 10 and containing an average of 5 methyl hydrogen siloxane units per molecule, and 0.01 part of 3-methyl-1-butyn-3ol.

A curable organopolysiloxane composition of this invention was prepared by uniformly blending 100 parts of composition 1 with 1 part of hydroxyethyl acrylate and 4 parts of 1,2-bis[tris(1-methylvinyloxy)silyl]ethane. This composition was then coated on sheets formed from polyphenylene sulfide (PPS) and polycarbonate and heat-cured at 120° C. for 1 hour in an oven to yield a silicone elastomer that strongly adhered to the substrate. When sufficient force was exerted to peel the elastomer from the substrate, failure occurred within the elastomer layer.

For purposes of comparison a composition was prepared by mixing composition 1 with 4 parts of 1,2-bis[tris(1-methylvinyloxy)silyl]ethane. When tested for adhesion to the substrate as described in the preceding section of this example, the comparative composition exhibited poor adhesion on all substrates tested. When peeled from the substrate, separation occurred at the interface between the elastomer and the substrate.

EXAMPLE 2

Composition 2 was prepared by blending to homogeneity 100 parts of a dimethylvinylsiloxy-terminated dimethylpolysiloxane having an average molecular weight of 300, 20 parts of dry-process silica having a surface area of 200 g/m² and surface-treated with hexamethyldisilazane, 5 ppm (calculated as platinum, based on the dimethylpolysiloxane) of a chloroplatinic acid complex with tetramethyldivinyldisiloxane, 1.8 parts of a trimethylsiloxy-terminated methylhydrogensiloxanedimethylsiloxane copolymer having an average degree of polymerization of 10 and containing an average of 5 methylhydrogensiloxane units per molecule and 0.01 part of 3-methyl-1-butyn-3-ol.

A curable organopolysiloxane composition of this invention was prepared by uniformly mixing of composition 2 with 1 part of a mixture of hydroxyethyl acrylate and tetrakis(1-methylvinyloxy)silane in a weight ratio of 2:7, respectively. Using this composition and the substrates listed in Table I, test specimens were prepared and tested in accordance with the adhesion test described in section 8.3 of Japanese Industrial Standard (JIS) No. K6301 (published English language translation, available from Japanese Standards Association) and measured for peel strength. Prior to being tested the samples were cured by heating them for one hour at 120° C. In accordance with the test procedure, the peeling force was exerted at an angle of 90 degrees with respect to the plane of the substrate, the substrate measured 25.4 by 60.3 mm. and was 2.54 mm. thick, the strip of cured elastomer measured 127 by 25.4 mm. and was 5.37 mm. thick, and the area of bonding measured 25.4 by 25.4 mm. The peel strength values for all of the samples tested are recorded in Table I.

For comparative purposes, a curable organopolysiloxane composition was prepared by mixing composition 1 with 1 part of tetrakis(1-methylvinyloxy)silane only and subjected to the same peel strength test. The peel strength values for these samples are also reported in Table I.

TABLE I

| Substrate | Peel Strength (Kg./cm²) | |
|---|---|---|
| | Present Invention | Comparative Example |
| Iron | 34 | 32 |
| Nickel Plating | 36 | 26 |
| Brass | 42 | 16 |
| Aluminum Plating | 38 | 28 |
| Copper Plating | 41 | 21 |
| Polyphenylene Sulfide | 10 | 0 |

APPLICATION EXAMPLE 3

A reaction product of 1 part of hydroxyethyl acrylate and 4 parts of 1,2-bis[tris(1-methylvinyloxy)silyl]ethane was prepared by heating these ingredients in a reactor at 60° C. for 3 hours. 100 parts of composition 2 described in the preceding example 2 were then mixed with 5 parts of the above reaction product to obtain a curable organopolysiloxane composition of this invention. This curable organopolysiloxane composition was coated on sheets of polyphenylene sulfide and polycarbonate and heat-cured in an oven at 120° C. for 1 h.

The cured silicone elastomer strongly adhered to each of these substrates. When sufficient force was exerted to peel the elastomer from the substrate, failure occurred within the elastomer layer rather than at the interface between the elastomer and the substrate.

That which is claimed is:
1. In an improved curable organopolysiloxane composition comprising:
   A. an organopolysiloxane containing two or more alkenyl radicals bonded to silicon atoms in a molecule;
   B. an organohydrogenpolysiloxane containing at least two silicon-bonded hydrogen atoms per molecule in an amount equivalent to a molar ratio of silicon-bonded hydrogen atoms to alkenyl radicals in said organopolysiloxane of from 0.5:1 to 5:1;
   C. an amount of a hydrosilylation reaction catalyst sufficient to promote curing of said composition; and an amount of an adhesion promoter sufficient to achieve adhesion of the cured composition to a substrate with which said composition is in contact during curing the improvement comprises the presence as said adhesion promoter of either (1) a mixture consisting essentially of
D. from 0.01 to 5 weight percent, based on the combined weights of components A and B, of a carboxylic acid ester containing an acryloyloxy or methacryloyloxy group and a hydroxyalkyl group; and
E. from 0.01 to 10 weight percent, based on the combined weights of components A and B, of an organosilicon compound containing a silicon-bonded vinyloxy or substituted vinyloxy group, or
(2) a reaction product of said carboxylic acid ester and said organosilicon compound.

2. A curable composition according to claim 1, where the organopolysiloxane is a dimethylpolysiloxane containing vinyl radicals at the terminal positions, the organohydrogenpolysiloxane is a dimethylsiloxane/methylhydrogensiloxane copolymer, the ratio of silicon-bonded hydrogen atoms to vinyl radicals in the dimethylpolysiloxane is from 0.8:1 to 3:1, the hydrosilylation reaction catalyst is platinum metal or a platinum compound and is present at a concentration of from 0.1 to 100 ppm, calculated as platinum, based on the combined weight of said organopolysiloxane and said organohydrogenpolysiloxane, the carboxylic acid ester is selected from the group consisting of 2-hydroxyethyl acrylate, 2-hydroxyethyl methacrylate, 2,3-dihydroxypropyl acrylate and 2,3-dihydroxypropyl methacrylate and the organosilicon compound is selected from the group consisting of 3-glycidoxypropyltris(1-methylvinyloxy)silane, 1,2-bis[tris(1-methylvinyloxy)silyl]ethane, tetrakis(1-methylvinyloxy)silane, partial hydrolyzates of said organosilicon compound, mixtures of said organosilicon compound with organopolysiloxanes, and mixtures of said organosilicon compound with polyhydroxylated alcohols.

3. A curable composition according to claim 2 where said carboxylic acid ester is 2-hydroxyethyl acrylate, said organosilicon compound is tetrakis(1-methylvinyloxy)silane or 1,2-bis[tris(1-methylvinyloxy)silyl]ethane, the composition contains silica as a filler and an inhibitor for said catalyst, the concentration of said carboxylic acid ester is from 0.1 to 2 weight percent, and the concentration of said organosilicon compound is from 0.1 to 5 weight percent.

4. A curable composition according to claim 1 where said carboxylic acid ester and said organosilicon compound are reacted and the resultant reaction product is blended with the other ingredients of said composition.

5. A curable composition according to claim 4 where said reaction product is prepared by heating a mixture of said carboxylic acid ester and said organosilicon compound.

* * * * *